United States Patent
Nagata et al.

(10) Patent No.: US 12,504,750 B2
(45) Date of Patent: Dec. 23, 2025

(54) ABNORMALITY RESPONSE TEACHING SYSTEM, ABNORMALITY FACTOR ESTIMATION METHOD, ABNORMALITY RESPONSE TEACHING METHOD, AND PROGRAM

(71) Applicant: MITSUBISHI HEAVY INDUSTRIES, LTD., Tokyo (JP)

(72) Inventors: Yoshiyuki Nagata, Yokohama (JP); Hirofumi Ohara, Yokohama (JP); Tomoyuki Kojima, Yokohama (JP); Susumu Sekine, Yokohama (JP); Daiki Fujimura, Yokohama (JP); Toshishige Ai, Yokohama (JP); Manabu Saito, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 402 days.

(21) Appl. No.: 18/021,672

(22) PCT Filed: Aug. 30, 2021

(86) PCT No.: PCT/JP2021/031714
§ 371 (c)(1),
(2) Date: Feb. 16, 2023

(87) PCT Pub. No.: WO2022/102211
PCT Pub. Date: May 19, 2022

(65) Prior Publication Data
US 2023/0315077 A1   Oct. 5, 2023

(30) Foreign Application Priority Data
Nov. 12, 2020   (JP) ................. 2020-188660

(51) Int. Cl.
G05B 23/02   (2006.01)

(52) U.S. Cl.
CPC ............... G05B 23/0243 (2013.01)

(58) Field of Classification Search
CPC ........... G05B 23/0243; G05B 23/0275; G05B 23/0221; G05B 23/0272
See application file for complete search history.

(56) References Cited

U.S. PATENT DOCUMENTS

| 5,369,756 A | 11/1994 | Imura et al. |
| 2010/0100251 A1* | 4/2010 | Chao ............... G21D 3/001 700/292 |

(Continued)

FOREIGN PATENT DOCUMENTS

| JP | 3-213891 | 9/1991 |
| JP | 8-152912 | 6/1996 |

(Continued)

OTHER PUBLICATIONS

Naoki Kamitaki, "Plant Operator Supporting Device" (Espacenet machine translation for application JPH08152912), Jun. 11, 1996, Espacenet machine translation (Year: 1996).*

(Continued)

*Primary Examiner* — Christopher W Carter
(74) *Attorney, Agent, or Firm* — Wenderoth, Lind & Ponack, L.L.P.

(57) ABSTRACT

Provided is an abnormality response teaching system that estimates a factor of an abnormality and teaches a treatment for the factor. This abnormality response teaching system is provided with: an operation parameter acquisition unit for acquiring an operation parameter measured during operation of a device; a diagnosis information acquisition unit for acquiring diagnosis information indicating the result of a diagnosis of operation of a machine with which the device is provided, said diagnosis being executed prior to startup of the device; and a factor analysis unit for inputting the operation parameter and the diagnosis information to an (Continued)

FTA with which abnormality factors are analyzed, and thereby analyzing an abnormality factor, when an abnormality occurs in the device.

6 Claims, 9 Drawing Sheets

(56) References Cited

U.S. PATENT DOCUMENTS

| | | | |
|---|---|---|---|
| 2013/0282336 A1 | 10/2013 | Maeda et al. | |
| 2019/0235483 A1 | 8/2019 | Oktem et al. | |
| 2019/0278647 A1* | 9/2019 | Bakucz | G06F 11/2257 |

FOREIGN PATENT DOCUMENTS

| | | |
|---|---|---|
| JP | 8-202444 | 8/1996 |
| JP | 2012-137934 | 7/2012 |

OTHER PUBLICATIONS

Akihiko Yamada, "Method and Device for Diagnosing Abnormality of Machine Facility" (Espacenet machine translation for application JPH08202444), Aug. 9, 1996, Espacenet machine translation (Year: 1996).*

English language translation of the International Search Report issued Nov. 2, 2021 in corresponding International Application No. PCT/JP2021/031714.

English language translation of the Written Opinion of the International Searching Authority issued Nov. 2, 2021 in corresponding International Application No. PCT/JP2021/031714.

* cited by examiner

FIG. 3

| ABNORMALITY FACTOR | ELEMENT LEVEL | INSPECTION /CONSTRUCTION INFORMATION | DIAGNOSIS INFORMATION | OPERATION PARAMETER 1 | OPERATION PARAMETER 2 | ... | DETERMINATION METHOD |
|---|---|---|---|---|---|---|---|
| VALVE OPERATION DEFECT | ELEMENT 4 | — | A | A | — | ... | PRESENCE OR ABSENCE OF ABNORMALITY IS DETERMINED BASED ON DIAGNOSIS RESULT OF FLOW REGULATION VALVE AND DIFFERENCE BETWEEN REQUEST TO FLOW REGULATION VALVE AT TIME OF IGNITION AND RESPONSE |
| VALVE RECOVERY ERROR AT TIME OF REGULAR INSPECTION | ELEMENT 4 | A | A | — | — | ... | POSSIBILITY OF ABNORMALITY FACTOR IS DETERMINED BASED ON DIAGNOSIS RESULT OF VALVE OF FUEL SYSTEM AND INFORMATION AS TO WHETHER OR NOT IT IS AFTER REGULAR INSPECTION |
| FUEL GAS REPLACEMENT DEFECT | ELEMENT 4 | A | — | — | — | ... | POSSIBILITY OF INSUFFICIENT REPLACEMENT OF NITROGEN IN FUEL GAS IS DETERMINED BASED ON INFORMATION AS TO WHETHER OR NOT IT IS AFTER REGULAR INSPECTION |
| IGV OPERATION DEFECT | ELEMENT 4 | — | — | — | A | ... | PRESENCE OR ABSENCE OF ABNORMALITY OF IGV OPENING DEGREE IS DETERMINED BASED ON INTAKE AIR FLOW RATE CALCULATED FROM INDEX DIFFERENTIAL PRESSURE AND DIFFERENCE BETWEEN REQUEST TO IGV AT TIME OF IGNITION AND RESPONSE |
| ... | ... | ... | ... | ... | ... | ... | ... |

ABNORMALITY RESPONSE TEACHING SYSTEM, ABNORMALITY FACTOR ESTIMATION METHOD, ABNORMALITY RESPONSE TEACHING METHOD, AND PROGRAM

TECHNICAL FIELD

The present disclosure relates abnormality response teaching system, an abnormality factor estimation method, an abnormality response teaching method, and a program. The present disclosure claims priority based on Japanese Patent Application No. 2020-188660 filed in Japan on Nov. 12, 2020, the contents of which are incorporated herein by reference.

BACKGROUND ART

In the related art, when an abnormality occurs in a plant, a monitoring person has performed a work of estimating the cause of the abnormality by comparing a measured value, which is measured by a sensor at the time of occurrence of the abnormality, with a fault tree. PTL 1 discloses a technique of preferably performing a display of the fault tree in such a situation.

PTL 2 discloses an abnormality diagnosis system that clarifies a diagnosis and a treatment to be performed for an abnormality that has occurred by detecting the abnormality in a plant, based on data acquired from a plurality of sensors installed in the plant and by connecting the detected abnormality and associated maintenance history information, and that provides a work instruction to a service person. The abnormality diagnosis system presents an FTA showing a diagnosis flow together with an abnormality diagnosis result to the service person. The service person can promptly perform appropriate countermeasures by comparing the diagnosis result of the abnormality diagnosis system with the FTA and proceeding with a diagnosis work.

CITATION LIST

Patent Literature

[PTL 1] Japanese Unexamined Patent Application Publication No. 03-213891
[PTL 2] Japanese Unexamined Patent Application Publication No. 2012-137934

SUMMARY OF INVENTION

Technical Problem

The work of estimating the cause of an abnormality by comparing the data measured by the sensor with the FTA has a high work cost and requires a lot of time to estimate the factor with high accuracy. Thereby, there is a possibility of a delay in handling the abnormality at the time of occurrence.

The present disclosure provides an abnormality response teaching system, an abnormality factor estimation method, an abnormality response teaching method, and a program capable of solving the above-described problems.

Solution to Problem

According to one aspect of the present disclosure, an abnormality response teaching system includes; an operation parameter acquisition unit that acquires an operation parameter measured during an operation of a device; a diagnosis information acquisition unit that acquires diagnosis information indicating a result of an operation diagnosis of a machine included in the device, in which the operation diagnosis is executed before activation of the device; and a factor analysis unit that inputs, when an abnormality occurs in the device, the operation parameter and the diagnosis information to an FTA, with which a factor of the abnormality is analyzed, to analyze the factor of the abnormality.

According to one aspect of the present disclosure, an abnormality factor estimation method includes: acquiring an operation parameter measured during an operation of a device; acquiring diagnosis information indicating a result of an operation diagnosis of a machine included in the device, in which the operation diagnosis is executed before activation of the device; and inputting, when an abnormality occurs in the device, the operation parameter and the diagnosis information to an FTA, with which a factor of the abnormality is analyzed, to analyze the factor of the abnormality.

According to one aspect of the present disclosure, an abnormality response teaching method includes: acquiring an operation parameter measured during an operation of a device; acquiring diagnosis information indicating a result of an operation diagnosis of a machine included in the device, in which the operation diagnosis is executed before activation of the device; inputting, when an abnormality occurs in the device, the operation parameter and the diagnosis information to an FTA, with which a factor of the abnormality is analyzed, to analyze the factor of the abnormality; and outputting treatment work instruction information in which instruction for treatment work corresponding to the factor is transmitted.

According to one aspect of the present disclosure, a program for causing a computer to execute a process includes: acquiring an operation parameter measured during an operation of a device; acquiring diagnosis information indicating a result of an operation diagnosis of a machine included in the device, in which the operation diagnosis is executed before activation of the device; and inputting, when an abnormality occurs in the device, the operation parameter and the diagnosis information to an FTA, with which a factor of the abnormality is analyzed, to analyze the factor of the abnormality.

Advantageous Effects of Invention

According to the abnormality response teaching system, the abnormality factor estimation method, the abnormality response teaching method, and the program, when an abnormality occurs in a plant or the like, the factor of the abnormality can be estimated with high accuracy and in a short time. According to the abnormality response teaching method of the present disclosure, when an abnormality occurs in a plant or the like, it is possible to recognize a method for handling the abnormality.

BRIEF DESCRIPTION OF DRAWINGS

FIG. 3 is a diagram illustrating an example of a determination condition of the fault tree according to the embodiment.

DESCRIPTION OF EMBODIMENTS

Embodiment

Hereinafter, an abnormality response teaching system according to an embodiment will be described in detail with reference to FIGS. 1 to 8.
(Configuration)

Figure 1:
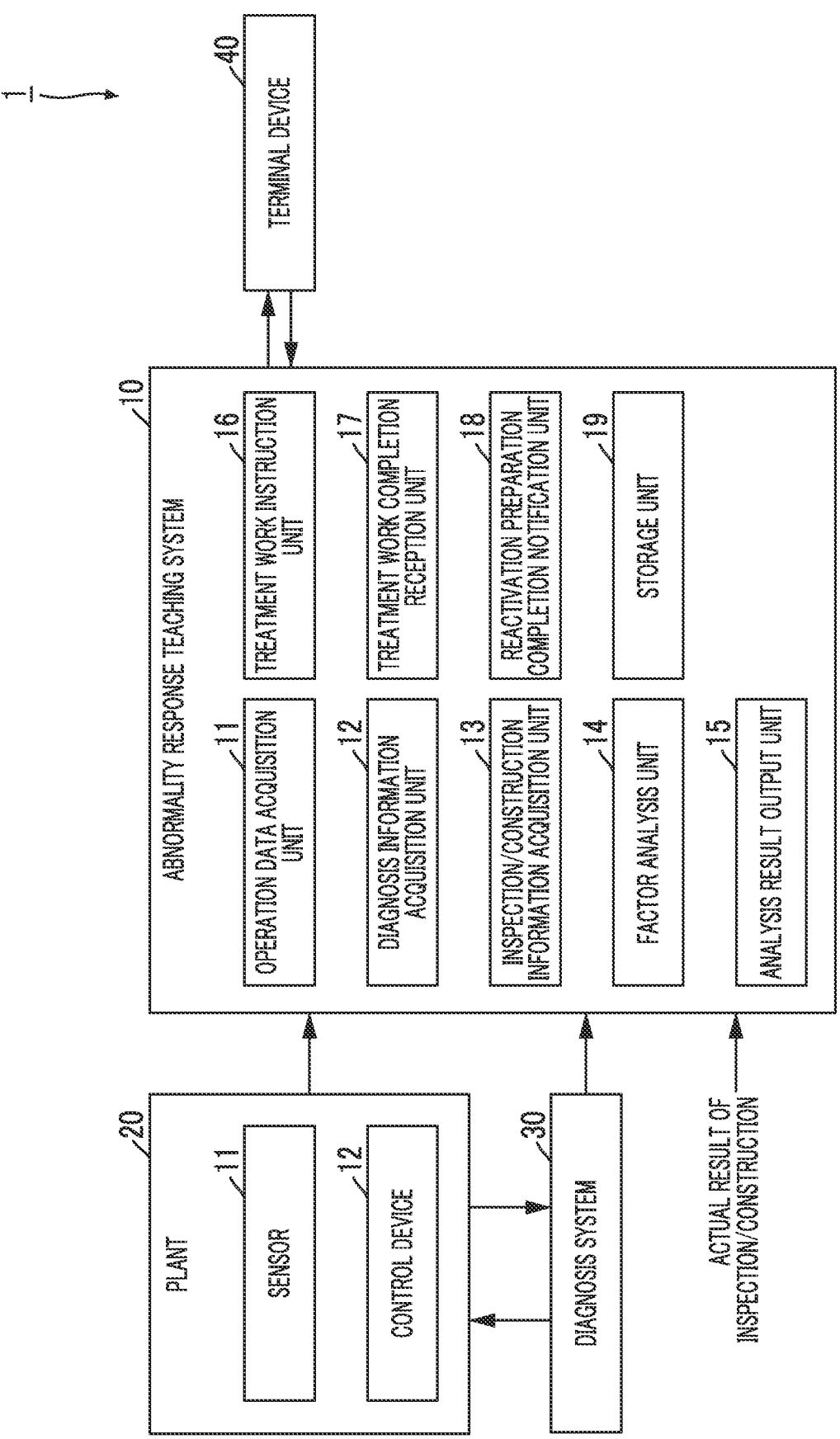
FIG. 1 is a block diagram illustrating an example of an abnormality response teaching system according to an embodiment.

FIG. 1 is a block diagram illustrating an example of the abnormality response teaching system according to the embodiment.

A recovery management system 1 includes an abnormality response teaching system 10, a plant 20, a diagnosis system 30, and a terminal device 40. The abnormality response teaching system 10 is communicably connected to the plant 20, the diagnosis system 30, and the terminal device 40.

The plant 20 is a plant that is a recovery management target. The plant 20 is provided with a large number of sensors 21. The plant 20 includes a control device 22. The sensor 21 outputs a measured value (an operation parameter), which is measured, to the abnormality response teaching system 10. The control device 22 acquires the operation parameter measured by the sensor 21, determines an operating state of the plant 20, and outputs the determination result to the abnormality response teaching system 10. For example, the control device 22 outputs an alarm signal when the operation parameter exceeds a threshold value and further outputs a trip signal when the operation parameter reaches a value at which the plant must be stopped.

The diagnosis system 30 checks an operation of a machine included in the plant 20 before activation of the plant 20 and outputs the result to the abnormality response teaching system 10 as diagnosis information. For example, the diagnosis system 30 outputs an instruction signal that changes an opening degree of a valve, which is included in the plant 20, from closed to open and from open to closed in a step shape, and diagnoses an operation result of the valve with respect to that instruction signal. For example, a Sensor that is capable of detecting the opening degree is attached to the valve, and the diagnosis system 30 acquires the opening degree detected by the sensor. For example, when the operation of the valve is completely normal, the diagnosis system 30 diagnoses that the operation of the valve is "normal" and outputs a value indicating normality to the abnormality response teaching system 10. When it cannot be said that there is not a problem even though the operation of the valve is not abnormal (for example, a delay occurs in an opening operation with respect to an opening degree command), the diagnosis system 30 diagnoses that the operation of the valve is "substantially normal", and outputs a value indicating that the operation of the valve is substantially normal to the abnormality response teaching system 10. For example, when the operation of the valve is abnormal, the diagnosis system 30 diagnoses that the operation of the valve is "abnormal" and outputs a value indicating the abnormality to the abnormality response teaching system 10.

When the plant 20 outputs an alarm signal or a trip signal, the abnormality response teaching system 10 estimates an abnormality factor that becomes a cause of the trip signal or the like, based on the operation parameter, the diagnosis information from the diagnosis system 30, and the like and teaches treatment work for the abnormality factor. The abnormality response teaching system 10 includes an operation data acquisition unit 11, a diagnosis information acquisition unit 12, an inspection/construction information acquisition unit 13, a factor analysis unit 14, an analysis result output unit 15, a treatment work instruction unit 16, a treatment work completion reception unit 17, a reactivation preparation completion notification unit 18, and a storage unit 19.

The operation data acquisition unit 11 acquires the latest operation data output by the plant 20. The operation data includes an operation parameter measured by the sensor 21, and an alarm signal and a trip signal output by the control device 22. The alarm signal or the trip signal serves as a trigger for processing of estimating the abnormality factor and teaching the treatment work. The operation parameter is used for determining the abnormality factor.

The diagnosis information acquisition unit 12 acquires the diagnosis result (diagnosis information) of the operation diagnosis performed by the diagnosis system 30 before the activation of the plant 20. When the operation is diagnosed as "abnormal" by the diagnosis system 30, the plant 20 is activated after the abnormality is handled. When the diagnosis system 30 diagnoses the operation as "normal" or "substantially normal", the plant 20 is activated, and then when the plant 20 is stopped due to an abnormality, the diagnosis result obtained by the diagnosis system 30 is used for estimating an abnormality factor. For example, when "normal" is diagnosed by the diagnosis system 30, in the estimation of an abnormality factor, an item related to an operation of a machine diagnosed as "normal" can be excluded from the candidates for the abnormality factor. When "substantially normal" is diagnosed by the diagnosis system 30, in the estimation of the abnormality factor, an item related to the machine diagnosed as "substantially normal" can be excluded from the candidates having a high possibility of being the abnormality factor and can be treated as a target for which the possibility of being an abnormality factor cannot be completely denied although the possibility is low.

The inspection/construction information acquisition unit 13 acquires inspection/construction information including an inspection, which is performed on the plant 20, the presence or absence of construction, or an operation check result immediately after the inspection. For example, in a regular inspection, it is assumed that a machine or a component included in the plant 20 is disassembled or that a valve that is kept closed during operation is opened. In a case where there is a work error when the disassembled machine is assembled and returned to the original state after the regular inspection, or when the valve is forgotten to be returned to the original state after the regular inspection, this may cause a trip or the like in the operation of the plant 20 after the regular inspection. As described above, an inspection or construction, which involves disassembly of the machine or the like, may cause an abnormality. In the estimation of the abnormality factor, the inspection/construction information acquisition unit 13 acquires the inspection/construction information indicating the presence or absence of an inspection or of construction before the activation of the plant 20 in order to determine the possibility that the inspection or the construction has affected the estimation.

When the factor analysis unit 14 acquires an alarm signal or a trip signal from the plant 20, the factor analysis unit 14 inputs the operation parameter, which is measured by the sensor 21, the diagnosis information, which is output by the diagnosis system 30, and the inspection/construction information to a fault tree analysis (FTA), and analyzes the abnormality factor of the plant 20 that is the source of the alarm signal and the trip signal. Inputting to the FTA means that the operation parameter, the diagnosis information, and the inspection/construction information are applied to the determination condition set for each branch of the fault tree used in the FTA and for each element, and determination of whether or not the determination condition is satisfied is performed. For example, the factor analysis unit 14 inputs sensor data or the like to the FTA and estimates an abnormality factor by sequentially tracing the tree from the top while checking the determination condition.

The analysis result output unit 15 outputs the abnormality factor estimated by the factor analysis unit 14.

The treatment work instruction unit 16 specifies the treatment work for the abnormality factor estimated by the factor analysis unit 14 and transmits a treatment work instruction, in which instruction to perform the treatment work is transmitted, to the terminal device 40. The treatment work is work for removing the abnormality factor of the plant 20 and enabling reactivation of the plant 20.

The treatment work completion reception unit 17 acquires information indicating the completion of the treatment work. For example, when the treatment work for which instruction was given is completed, a worker inputs the completion of the treatment work to the terminal device 40. When the completion of the treatment work is input, the terminal device 40 notifies the abnormality response teaching system 10 of the completion of the treatment work, and the treatment work completion reception unit 17 acquires the notification.

The reactivation preparation completion notification unit 18 notifies the terminal device 40 or a control room where the operation is being monitored by an operator of the plant 20 that the plant 20 can be reactivated. When all the treatment work is completed, the reactivation preparation completion notification unit 18 determines that the plant 20 can be reactivated.

The storage unit 19 stores the operation data acquired by the operation data acquisition unit 11, the diagnosis information the diagnosis acquired by information acquisition unit 12, the inspection/construction information acquired by the inspection/construction information acquisition unit 13, a fault tree for each event that caused an alarm signal or a trip signal, the information about the treatment work associated with the abnormality factor, or the like.

The terminal device 40 is, for example, a portable terminal owned by an operator of the plant 20. The terminal device 40 displays the treatment work of which notification was sent from the abnormality response teaching system 10. The operator performs work based on information displayed on the terminal device 40 and handles the abnormality of the plant 20. When the treatment work is completed, the completion of the treatment work is input to the terminal device 40.

Next, an estimation method of an abnormality factor will be described with reference to FIGS. 2 to 3.

Figure 2:
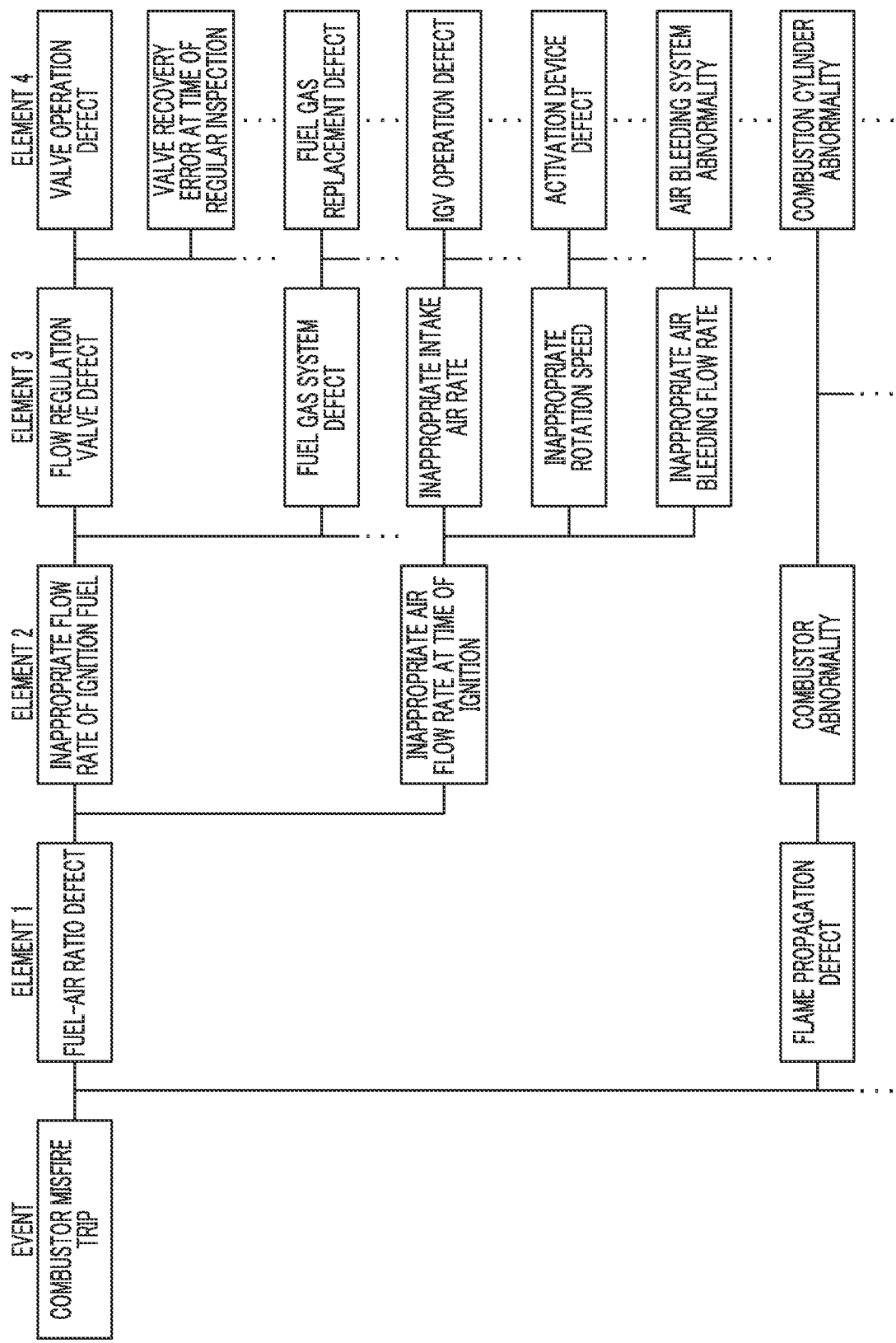
FIG. 2 is a diagram illustrating an example of a fault tree according to the embodiment.

FIG. 2 illustrates an example of a fault tree. FIG. 2 illustrates a part of the fault tree obtained as a result of analyzing the factor of a trip due to a misfire of a combustor among various events that cause a gas turbine trip. For example, the misfire of the combustor occurs due to a fuel-air ratio defect, a flame propagation defect (element 1), or the like. For example, the fuel-air ratio defect occurs due to an inappropriate flow rate of ignition fuel or to an inappropriate air flow rate at the time of ignition (element 2). For example, the inappropriate flow rate of the ignition fuel occurs due to a defect of a flow regulation valve that regulates the fuel flow rate, a defect of a fuel gas system, or the like (element 3). For example, the defect of the flow regulation valve occurs due to an operation defect of the flow regulation valve, an error in the recovery work of a valve operated at the time of the regular inspection, or the like (element 4). In the example in FIG. 2, when the event can be analyzed up to the level of the element 4 by tracing the fault tree, it means that the cause of the trip due to the misfire of the combustor can be specified. The factor analysis unit 14 searches for the element 4 specified by this data by using the operation parameter, the diagnosis information, and the inspection/construction information. A determination condition, which is used for the determination of each branch on the tree, is set in the storage unit 19 together with the fault tree, and the factor analysis unit 14 analyzes an abnormality factor based on the determination condition.

FIG. 3 illustrates an example of a determination condition for specifying the element 4. In the table, items that are marked with A indicate items used for the determination for specifying the abnormality factor. For example, in the case of a valve operation defect, the presence or absence of an abnormality is determined by using the diagnosis information for the flow regulation valve and a difference between an opening degree command with respect to the flow regulation valve at the time of ignition and the response indicated by an operation parameter 1 (for example, a measured value obtained from a flow rate sensor, which measures a fuel flow rate downstream of the flow regulation valve, a pressure sensor, which measures a fuel pressure, or the like) with respect to the opening degree command. For example, when the diagnosis information is "substantially normal" and the difference between the opening degree command with respect to the flow regulation valve and the response is equal to or larger than a predetermined value, the factor analysis unit 14 determines that the possibility of a valve operation defect as the abnormality factor is high (A). Alternatively, when the diagnosis information is "substantially normal" even when the difference between the opening degree command with respect to the flow regulation valve and the response is normal, the factor analysis unit 14 determines that the possibility of a valve operation defect as the abnormality factor cannot be ruled out (B). When the diagnosis information is "normal" and the difference between the opening degree command with respect to the flow regulation valve and the response is equal to or within the predetermined value, the factor analysis unit 14 determines that the possibility of a valve operation defect as the abnormality factor is low (C).

For example, in the case of a valve recovery error at the time of the regular inspection, the presence of absence of an abnormality is determined based on the inspection/construction information and the diagnosis information for the valve of a fuel system. For example, when the diagnosis information is "normal" and the inspection/construction information is "absence", the factor analysis unit 14 determines that the possibility of a valve recovery error at the time of the regular inspection as the abnormality factor is low (C). For example, when the diagnosis information is "normal" and the inspection/construction information is "presence", it is determined that the possibility of a valve operation defect is high (A) or the like.

Similarly, in a case of a fuel gas replacement defect, the factor analysis unit 14 determines the possibility that the fuel gas replacement defect is a factor of the combustor misfire trip, based on the inspection/construction information. In a case of an inlet guide vane (IGV) operation defect, the factor analysis unit 14 determines the possibility that the IGV operation defect is a factor of the combustor misfire trip, based on an operation parameter 2.

Although FIG. 3 illustrates an example of the determination condition of the element 4, the determination condition related to the elements 1 to 3 may be set in the storage unit 19.

Generally, work is performed in which the monitoring person manually erases each element of the fault tree and estimates the abnormality factor by comparing the operation parameter at the time of occurrence of the abnormality with the fault tree. In contrast, in the present embodiment, the factor analysis unit 14 automatically determines the possibility that each element is an abnormality factor, based on a predetermined determination condition of each element, the operation parameter, or the like. As a result, it is possible to reduce the work cost of estimating the factor and the time required for estimating the abnormality factor. In the present embodiment, a determination is made by using the diagnosis information and the inspection/construction information in addition to the operation parameter. As a result, it is possible to estimate the possibility of the abnormality factor that cannot be determined by the operation parameter (for example, the "valve recovery error at the time of the regular inspection" and the "fuel gas replacement defect" in FIG. 3). For example, even when the determination can be made based on the operation parameter as in the case of the "valve operation defect" in FIG. 3, a more detailed determination can be made by using the diagnosis information together. As described above, according to the present embodiment, it is possible to improve the estimation accuracy of the abnormality factor.

Figure 4:
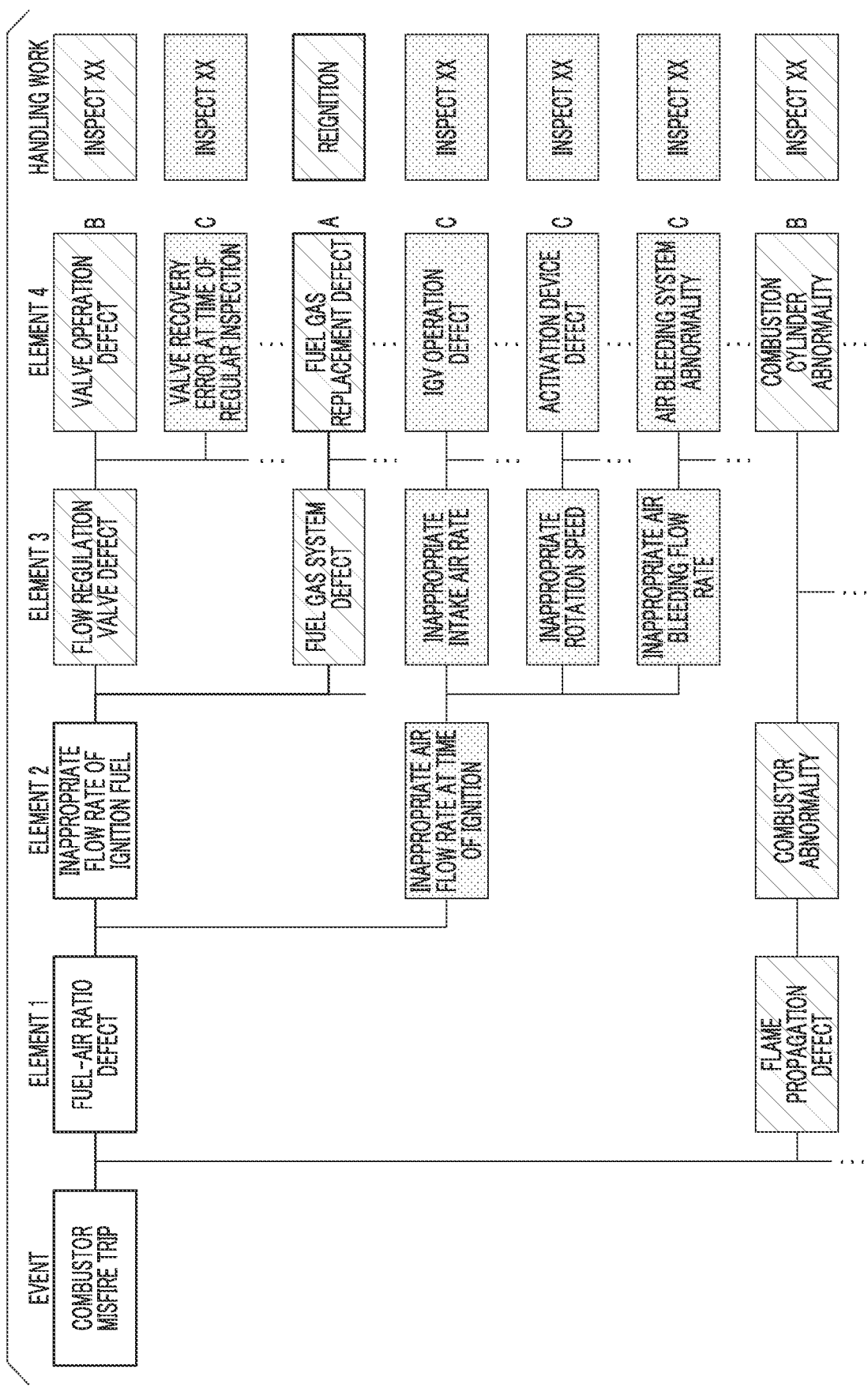
FIG. 4 is a diagram illustrating an example of an analysis result based on the fault tree according to the embodiment.

Next, an example of displaying the analysis result of the abnormality factor and processing, in which instruction for treatment work for the abnormality factor is transmitted, will be described with reference to FIGS. 4 to 5. FIG. 4 illustrates a result of the factor analysis unit 14 erasing the fault tree based on the operation parameter, the diagnosis information, the inspection/construction information, and the determination condition of each element. A factor that is determined to have a high possibility of being the abnormality factor is marked with "A", a factor that is determined to have a possibility of being the abnormality factor is marked with "B", and a factor that is determined to have a low possibility of being the abnormality factor is marked with "C". In the storage unit 19, appropriate treatment work is registered in advance in association with each element indicating an abnormality factor defined in the fault tree. For example, as illustrated in FIG. 4, the analysis result output unit 15 may output an image, in which the fault tree, the analysis result of the abnormality factor obtained by the factor analysis unit 14, and the treatment work are associated and displayed in a list, to a display device or the like. The analysis result output unit 15 may display the abnormality factor according to a degree of possibilities such that the abnormality factor considered to have the highest possibility (in the example in FIG. 4, the fuel gas replacement defect) is displayed in the most conspicuous manner, the abnormality factor determined to have a possibility (in the example in FIG. 4, the valve operation defect and the combustion cylinder abnormality) is displayed in a manner different from the abnormality factor considered to have a high possibility, and the abnormality factor determined to have a low possibility is grayed out. As a result, the monitoring person can easily recognize an abnormality factor of a trip of the plant 20, a degree of the possibility thereof, and treatment work required for each abnormality factor.

The treatment work instruction unit 16 instructs the worker to perform the treatment work based on the analysis result of the abnormality factor obtained by the factor analysis unit 14 and the treatment work for the abnormality factor registered in the storage unit 19. For example, the treatment work instruction unit 16 specifies the corresponding treatment work for all the abnormality factors (A and B) determined to have a possibility by the factor analysis unit 14, and transmits the abnormality factor and the treatment work instruction to the terminal device 40, For example, it is assumed that the determination result of the factor analysis unit 14 is "insufficient gas replacement", and "reignition" is registered in the storage unit 19 as the treatment work of the "insufficient gas replacement". The treatment work instruction unit 16 transmits the abnormality factor "insufficient gas replacement" and the treatment work "reignition" thereof to the terminal device 40. FIG. 5 illustrates an example of the treatment work instruction that is transmitted to the terminal device 40. As illustrated in FIG. 5, a message "Please perform ignition work because the ignition failure (combustor misfire trip) is most likely due to insufficient gas replacement" is displayed on a display screen of the terminal device 40. The worker performs the ignition work with reference to this display. At this time, the treatment work instruction unit 16 may further transmit treatment work procedure information that teaches a specific method of performing the ignition work. The treatment work procedure information may include not only sentences but also figures, photographs, moving images, and the like. As a result, it is possible to quickly check and remove the factor of the misfire trip of the combustor. As described above, by providing the treatment work instruction, the worker can clarify what to do, quickly remove the abnormality factor, and reactivate the plant 20.

Figure 5:
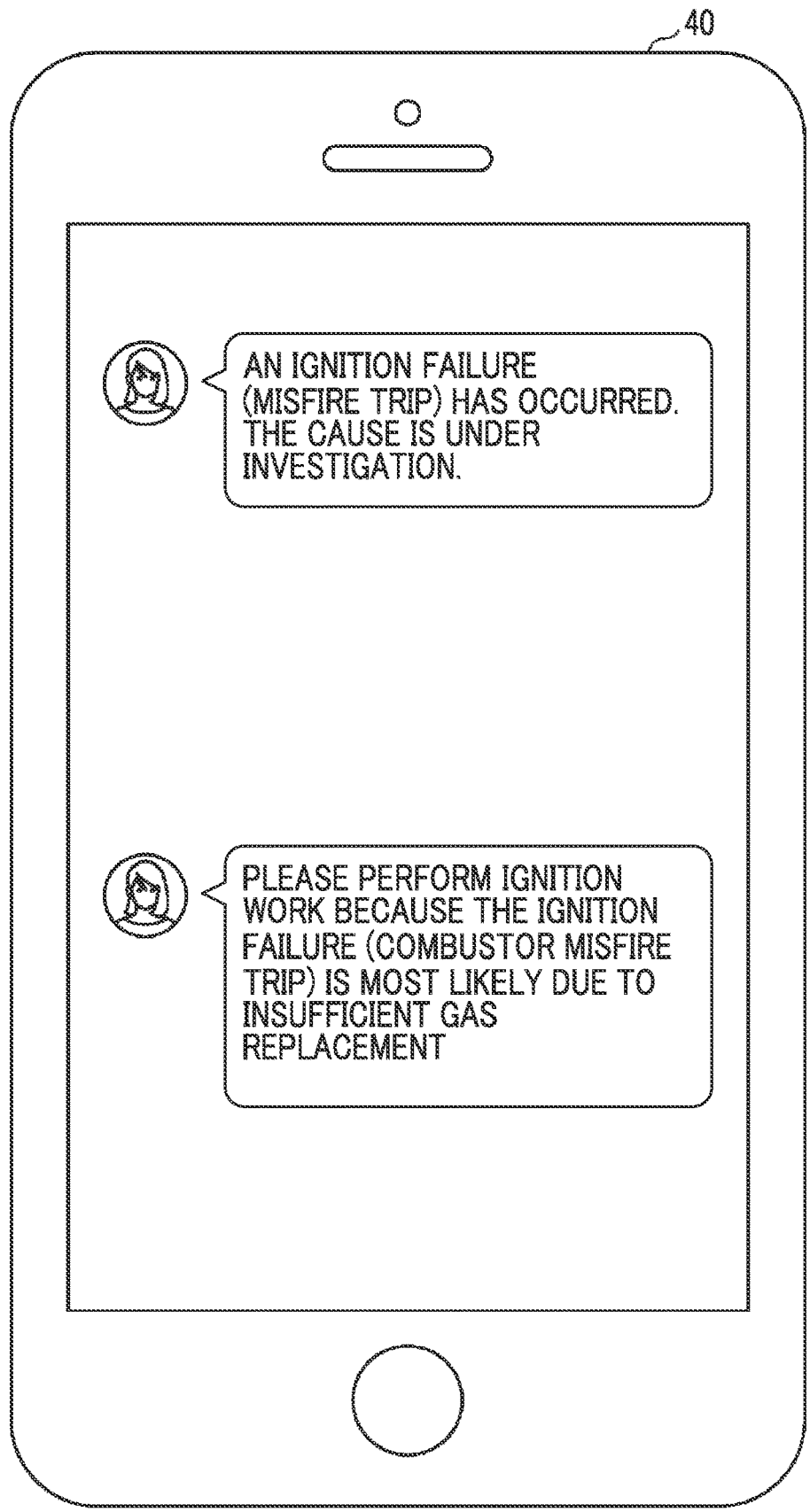
FIG. 5 is a diagram illustrating an example of notification of treatment work instruction information according to the embodiment.

The treatment work instruction illustrated in FIG. 5 is an instruction in which instruction to perform the ignition work is transmitted in words. The treatment work instruction unit 16 may instruct the worker to perform the treatment work by using not only words but also figures or moving images.

Figure 6A:
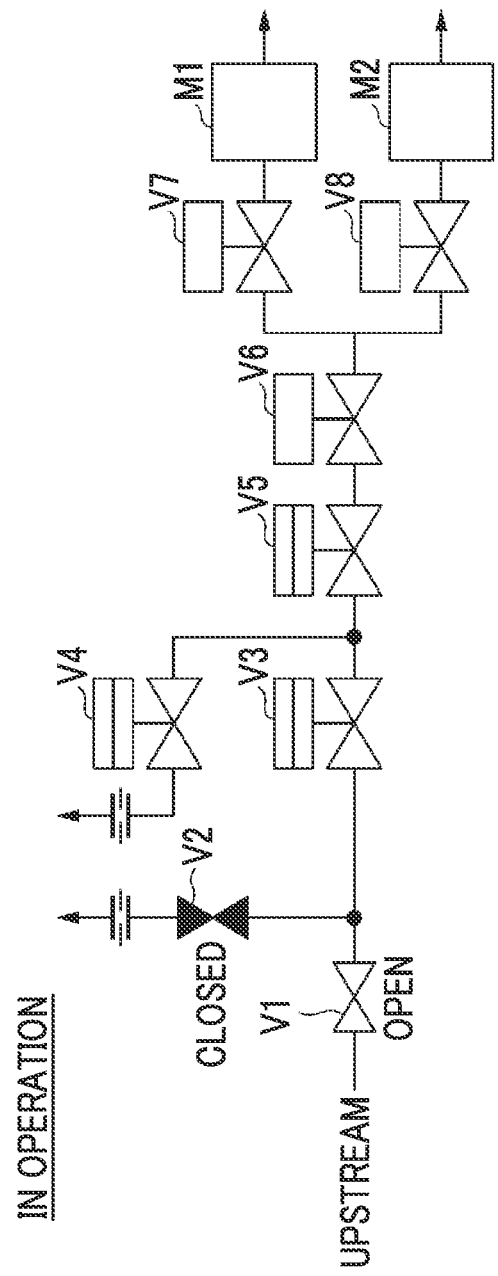
FIG. 6A is a first diagram illustrating an example of the treatment work instruction information according to the embodiment.
Figure 6B:
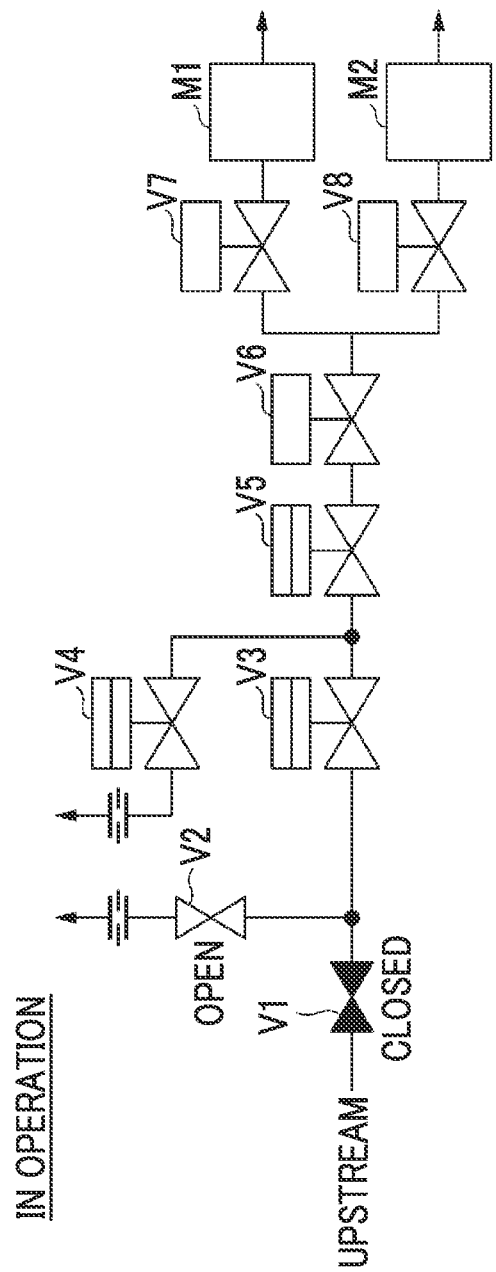
FIG. 6B is a first diagram illustrating an example of the treatment work instruction information according to the embodiment.

FIG. 6A and FIG. 6B illustrate schematic configuration diagrams of the fuel system of the gas turbine. During the operation of the gas turbine, the fuel flows from the left side to the right side of the paper and is supplied from manifolds M1 and M2 to a combustion chamber. The fuel system is provided with an isolation valve V1, a vent valve V2, a shutoff valve V3, a vent valve V4, a shutoff valve V5, a pressure regulation valve V6, a flow regulation valve V1, and a flow regulation valve V8 in this order from an upstream side in a fuel flow direction. The isolation valve V1 and the vent valve V2 are valves that are manually opened and closed. As illustrated in FIG. 6A, the isolation valve V1 is opened and the vent valve V2 is closed during the operation of the gas turbine. In contrast, during the regular inspection, the isolation valve V1 is closed and the vent valve V2 is opened as illustrated in FIG. 6B. Assuming that the regular inspection has been performed before the activation of the plant 20 and a misfire trip of the combustor has occurred in the plant 20, the inspection/construction information "presence" is input, and as described in FIGS. 3 and 4, the factor analysis unit 14 estimates that there is a possibility (or a high possibility) of "valve recovery error at the time of the regular inspection" as the abnormality factor. Thereafter, the treatment work instruction unit 16 transmits the treatment work information such as "check isolation valve V1 and vent valve V2" to the terminal device 40 to handle the "valve recovery error at the time of the regular inspection", for example. The treatment work instruction unit 16 may transmit, for example, FIG. 6A, and may transmit a message such as "Please check that isolation valve V1 is open and vent valve V2 is closed" and "Please open isolation valve V1 and close vent valve V2 if the isolation valve V1 is closed and the vent valve V2 is open". Further, the treatment work instruction unit 16 may transmit a moving image showing a work procedure of guiding positions of the isolation valve V1 and the vent valve V2, opening the isolation valve V1, and closing the vent valve V2. As a result, even an inexperienced worker can reliably perform the treatment work.

As a common example, in treatment work, a case of performing a series of the treatment work is considered such that a machine or a component, which is a work target, is isolated by operating an isolation valve to ensure work safety, and an inspection, a repair, or the like is performed on the machine or the component, a state for satisfying a reactivation condition of the plant 20 is created by further operating the recovery valve, and finally the isolation valve is returned to the original state. In this case, for example, the treatment work instruction unit 16 may output the isolation valve instruction information, in which instruction for an operation of the isolation valve is transmitted, the work instruction information, in which instruction for the work procedure for a component or the like, which is present at a position isolated by the isolation valve, and the information about the component and the component position are transmitted, and the recovery valve instruction information, in which instruction for an operation of the recovery valve is transmitted, in a work order. In the work instruction information, information about a component, which is present near the component that is a work target and is easily mistaken for the component that is a work target, a position of the component, or the like may be output together. By providing information in which the work procedure or the work position is described in detail in this way, the worker can perform the treatment work without error even under a tense situation at the time of occurrence of an abnormality.

(Operation)

Next, the operation of the abnormality response teaching system 10 will be described with reference to FIG. 7.

Figure 7:
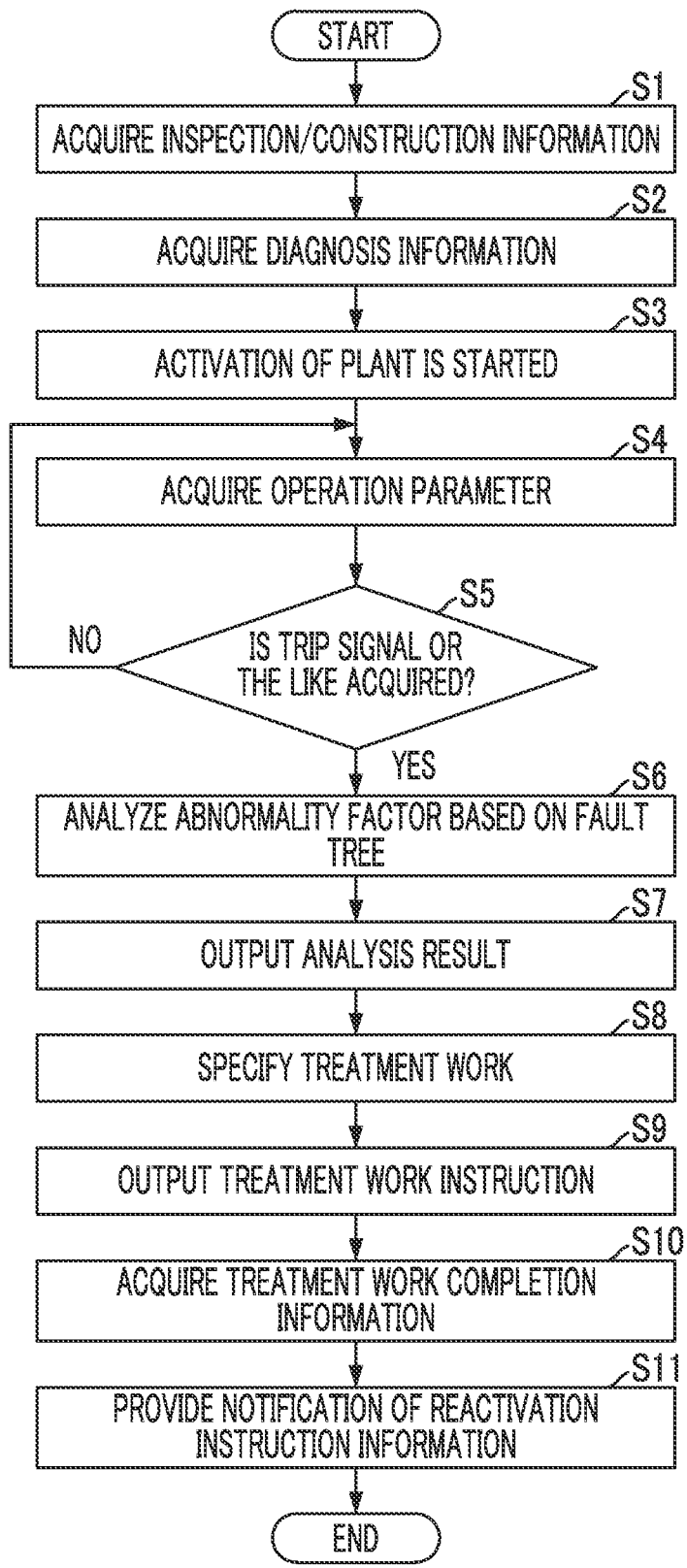
FIG. 7 is a flowchart illustrating an example of an operation of the abnormality response teaching system according to the embodiment.

FIG. 7 is a flowchart illustrating an example of the operation of the abnormality response teaching system according to the embodiment.

As a premise, it is assumed that this is before the plant 20 is activated. First, the operator inputs the inspection/construction information indicating whether or not the regular inspection is performed to the abnormality response teaching system 10. The inspection/construction information acquisition unit 13 acquires the input inspection/construction information and records the inspection/construction information in the storage unit 19 (step S1). Next, a person in charge of the diagnosis system 30 operates the diagnosis system 30 to perform an operation diagnosis of a plurality of machines provided in the plant 20 prior to the activation of the plant 20. A result of the operation diagnosis is output to a display device or the like of the diagnosis system 30, and when an abnormality is diagnosed, an appropriate handling of the abnormality is performed. When no abnormality is found in the operation diagnosis, the diagnosis system 30 outputs the diagnosis information for each machine, in which the diagnosis is performed, to the abnormality response teaching system 10. The diagnosis information acquisition unit 12 acquires the diagnosis information and records the diagnosis information in the storage unit 19 (step S2). Next, the activation of the plant 20 is started by the operation of the operator of the plant 20 (step S3). When the activation of the plant 20 is started, the operation data acquisition unit 11 acquires the operation parameter from the plant 20 and records the operation parameter in the storage unit 19 (step S4). The operation parameters include an operation parameter measured by the sensor 21 of the plant 20, various control signals output from the control device 22, and the like. Thereafter, the plant 20 continues to operate, and the operation data acquisition unit 11 continues to acquire the operation parameter. When the operation data acquisition unit 11 acquires an alarm signal or a trip signal from the plant 20 (step S5: Yes), the abnormality response teaching system 10 starts analysis processing of the abnormality factor. First, the factor analysis unit 14 reads the inspection/construction information, the diagnosis information for each machine, the operation parameter before and after the occurrence of an abnormality, the FTA fault tree of an event indicated by an alarm signal or a trip signal (FIG. 2), and the determination condition for determining branches or elements of the fault tree (FIG. 3), from the storage unit 19. Next, the factor analysis unit 14 analyzes the abnormality factor based on the fault tree (step S6). Based on the inspection/construction information, the diagnosis information, the operation parameter, and the determination condition of each element, the factor analysis unit 14 erases an element that does not meet the determination condition and specifies an element that meets the determination condition, that is, specifies an abnormality factor. The abnormality factor to be specified may be one or a plurality. The factor analysis unit 14 may perform ranking in accordance with the degree of possibilities, such as an abnormality factor having a high possibility (A in FIG. 4), an abnormality factor having an intermediate possibility (B in FIG. 3), and the like according to the extent to which the operation parameter or the like meets the determination condition. Next, the analysis result output unit 15 outputs the analysis result of the abnormality factor to the display device or the like (step S7). For example, the analysis result output unit 15 may display the abnormality factor remaining as a result of the erasing with respect to the fault tree, together with the accuracy thereof, as illustrated in FIG. 4. The analysis result output unit 15 may further display the treatment work corresponding to the abnormality factor as illustrated in FIG. 4.

Next, the treatment work instruction unit 16 specifies the treatment work corresponding to the abnormality factor estimated by the factor analysis unit 14 (step S8). The treatment work instruction unit 16 reads the treatment work corresponding to the abnormality factor estimated to be possible (A or B in FIG. 4) out of the information in which the treatment work is set for each abnormality factor registered in advance in the storage unit 19. Next, as illustrated in FIG. 5, the treatment work instruction unit 16 outputs the treatment work instruction, in which instruction to perform the treatment work that is specified in step S8 is transmitted, to the terminal device 40 (step S9). The worker performs the treatment work for which instruction was given. When the treatment work is performed, the worker inputs the completion of the treatment work to the terminal device 40. The terminal device 40 transmits treatment work completion information to the abnormality response teaching system 10. In the abnormality response teaching system 10, the treatment work completion reception unit 17 acquires the treatment work completion information (step S10). Alternatively, the worker may capture a photograph or a moving image of a work target location after the treatment work is completed by using the terminal device 40, and the terminal device 40 may transmit this image data to the abnormality response teaching system 10. The abnormality response teaching system 10 acquires the image data. The operator checks for the content of the image data and checks whether or not the treatment work has been performed correctly. When it is checked that the treatment work has been performed correctly, the operator inputs to the abnormality response teaching system 10 that the treatment work is completed. The treatment work completion reception unit 17 acquires the treatment work completion information. The treatment work completion reception unit 17 may display an acquisition situation of the completion information for the treatment work for which instruction was given by the treatment work instruction unit 16. As a result, a recovery worker can check a progress situation of the handling of the abnormality. When the treatment work completion reception unit 17 acquires the completion information for all the treatment work instructions, the reactivation preparation completion notification unit 18 notifies the terminal device 40 of the operator or the like, who is in charge of activating the plant 20, that the reactivation preparation of the plant 20 is completed (step S11). As a result, the plant 20 can be reactivated.

(Effects)

As described above, according to the abnormality response teaching system 10, it is possible to automatically perform the analysis processing of the abnormality factor by using the fault tree. Since the abnormality factor is estimated by using not only the operation parameter but also the diagnosis information or the inspection/construction information, it is possible to improve the estimation accuracy of the abnormality factor. The inspection/construction information is not essential in the analysis processing of the abnormality factor performed by the factor analysis unit 14. For example, when the inspection/construction information is not included in the determination condition of the fault tree, the inspection/construction information can be omitted.

By registering information about the treatment work corresponding to the estimated abnormality factor in advance and by providing the information to a user side together with the abnormality factor estimated to be possible, it is possible to quickly handle the abnormality. As a result, the plant 20 can be quickly restored to a normal operating state. By acquiring and managing the treatment work completion information, it is possible to recognize whether or not the treatment for the abnormality has been performed without omission.

The plant 20 can be reactivated in a state in which it is ensured that the plant 20 can be reactivated by providing a reactivation preparation completion notification at a stage when the treatment work for all the abnormality factors is completed.

In the above embodiment, although a plant including a gas turbine has been described as an example, a target of the abnormality response teaching system 10, the abnormality factor estimation method, the abnormality response teaching method, and the program of the present embodiment is not limited to this, and the above embodiment can be applied to any machines, equipment, and devices, such as a steam turbine, a boiler, a compressor, a turbocharger, and an engine.

Figure 8:
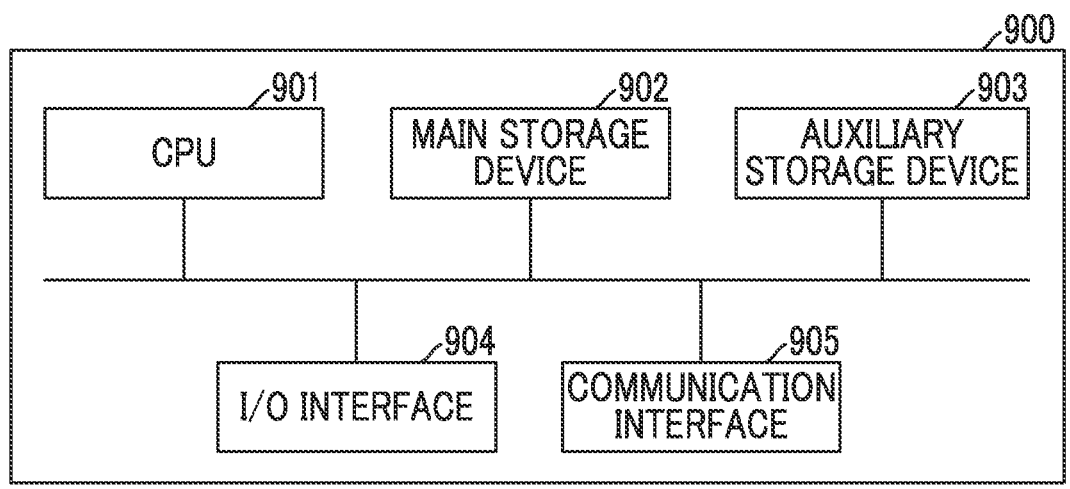
FIG. 8 is a diagram illustrating an example of a hardware configuration of the abnormality response teaching system according to the embodiment.

FIG. 8 is a diagram illustrating an example of a hardware configuration of the abnormality response teaching system according to the embodiment.

A computer 900 includes a CPU 901, a main storage device 902, an auxiliary storage device 903, an I/O interface 904, and a communication interface 905.

The above abnormality response teaching system 10 is mounted on the computer 900. Further, each above-mentioned function is stored in the auxiliary storage device 903 in the form of a program. The CPU 901 reads the program from the auxiliary storage device 903, loads the program into the main storage device 902, and executes the above processes according to the program. The CPU 901 ensures a storage area in the main storage device 902 according to the program. The CPU 901 ensures a storage area for storing the data being processed in the auxiliary storage device 903 according to the program.

A program for implementing all or some of the functions of the abnormality response teaching system 10 may be recorded on a computer-readable recording medium, and the program recorded on the recording medium may be read by a computer system and executed to perform processes by each functional unit. The term "computer system" as used herein includes hardware such as an OS or peripheral devices. The "computer system" is also assumed to include a homepage providing environment (or display environment) when a WWW system is used. The "computer-readable recording medium" refers to a portable medium such as a CD, DVD, or USB, or a storage device such as a hard disk built in the computer system. When this program is distributed to the computer 900 by using a communication line, the computer 900, which has received the distribution of the program, may load the program into the main storage device 902 and execute the above processes. The above-mentioned program may be a program for implementing some of the above-mentioned functions and further implementing the above-mentioned functions in combination with a program already recorded in the computer system. The abnormality response teaching system 10 may be configured with a plurality of computers 900.

As described above, some embodiments according to the present disclosure have been described, but all of these embodiments are presented as examples and are not intended to limit the scope of the invention. These embodiments can be implemented in various other forms, and various omissions, replacements, and changes can be made without departing from the gist of the invention. These embodiments and variations thereof are included in the scope of the invention described in the claims and the equivalent scope thereof, as well as in the scope and gist of the invention.

<Additional Notes>

The abnormality response teaching system 10, the abnormality factor estimation method, the abnormality response teaching method, and the program described in the embodiment are recognized as follows, for example.

(1) An abnormality response teaching system 10 according to a first aspect includes: an operation parameter acquisition unit (an operation data acquisition unit 11) that acquires an operation parameter measured during an operation of a device (a plant 20); a diagnosis information acquisition unit 12 that acquires diagnosis information indicating a result of an operation diagnosis of a machine included in the device, in which the operation diagnosis is executed before activation of the device; and a factor analysis unit 14 that inputs, when an abnormality occurs in the device, the operation parameter and the diagnosis information to an FTA (a fault tree), with which a factor of the abnormality is analyzed, to analyze the factor of the abnormality.

As a result, the work of analyzing the abnormality factor based on the FTA can be automated, and the time required for the analysis of the abnormality factor can be shortened. Since the abnormality factor is analyzed by using the operation parameter and the diagnosis information, it is possible to improve the analysis accuracy of the abnormality factor. As a result, the plant can be quickly returned to a normal operating state.

(2) The abnormality response teaching system 10 according to a second aspect is the abnormality response teaching system 10 of (1) and further includes: an inspection/construction information acquisition unit 13 that acquires inspection/construction information indicating an actual result of an inspection or of construction executed for the device, in which the factor analysis unit 14 inputs the operation parameter, the diagnosis information, and the inspection/construction information to the FTA to analyze the factor.

By further using the inspection/construction information for the analysis of the abnormality factor, it is possible to further improve the accuracy of the analysis of the abnormality factor.

(3) The abnormality response teaching system 10 according to a third aspect is the abnormality response teaching system 10 of (1) or (2) and further includes: a treatment work instruction unit 16 that outputs treatment work instruction information in which instruction for treatment work for the factor that is analyzed by the factor analysis unit 14 is transmitted.

By presenting the treatment work for checking or removing an abnormality factor, it is possible to quickly handle a treatment for the abnormality. The treatment work instruction unit 16 may output treatment work procedure information indicating the procedure of the treatment work in addition to the treatment work instruction information.

(4) The abnormality response teaching system 10 according to a fourth aspect is the abnormality response teaching system 10 of (3), in which the treatment work instruction unit 16 outputs isolation valve instruction information in which instruction for an operation of an isolation valve that ensures work safety is transmitted, work instruction information in which instruction for a work procedure for a component, which is present at a position isolated by the isolation valve, and information about the component and a position of the component are transmitted, and recovery valve instruction information in which instruction for an operation of a recovery valve for satisfying a reactivation condition of the device is transmitted.

By outputting the isolation valve information, the work instruction information, and the recovery valve instruction information, even an inexperienced worker can perform a series of treatment work of operating the isolation valve to ensure the work safety, performing inspection work or the like for a predetermined component or the like, creating a state in which reactivation is possible by operating the recovery valve, and returning the isolation valve to an original state.

(5) The abnormality response teaching system 10 according to a fifth aspect is the abnormality response teaching system 10 of (3) to (4) and further includes: a treatment work completion reception unit 17 that receives an input of completion of the treatment work; and a reactivation preparation completion notification unit 18 that provides a notification that a reactivation preparation is completed when all of the treatment work is completed.

By providing the treatment work completion reception unit, it is possible to recognize an implementation situation of the treatment work. By providing the reactivation preparation completion notification unit, it is possible to perform the reactivation of the plant 20 after all the treatment work is completed.

(6) The abnormality response teaching system 10 according to a sixth aspect is the abnormality response teaching system 10 of (1) to (5) and further includes: an analysis result output unit 15 that outputs an analysis result obtained by the factor analysis unit 14 together with a fault tree of the FTA.

By outputting the analysis result together with the fault tree, it is possible to check which abnormality factor is the factor of the abnormality that occurred at this time and which abnormality factor is not the factor of the abnormality, among the abnormality factors defined in the fault tree while referring to the structure of the fault tree.

(7) An abnormality factor estimation method according to a seventh aspect acquires an operation parameter measured during an operation of a device (a plant 20), acquires diagnosis information indicating a result of an operation diagnosis of a machine included in the device, in which the operation diagnosis is executed before activation of the device, and inputs, when an abnormality occurs in the device, the operation parameter and the diagnosis information to an FTA, with which a factor of the abnormality is analyzed, to analyze the factor of the abnormality.

(8) An abnormality response teaching method according to an eighth aspect acquires an operation parameter measured during an operation of a device (a plant 20), acquires diagnosis information indicating a result of an operation diagnosis of a machine included in the device, in which the operation diagnosis is executed before activation of the device, inputs, when an abnormality occurs in the device, the operation parameter and the diagnosis information to an FTA, with which a factor of the abnormality is analyzed, to analyze the factor of the abnormality, and outputs treatment work instruction information in which instruction for treatment Work corresponding to the factor is transmitted.

(9) The abnormality response teaching method according to a ninth aspect is the abnormality response teaching method of (8) and further includes: receiving an input of completion of the treatment work; and providing a notification that a reactivation preparation of the device is completed when all of the treatment work is completed.

(10) A program according to a tenth aspect causes a computer to execute a process including: acquiring an operation parameter measured during an operation of a device (a plant 20); acquiring diagnosis information indicating a result of an operation diagnosis of a machine included in the device, in which the operation diagnosis is executed before activation of the device; and inputting, when an abnormality occurs in the device, the operation parameter and the diagnosis information to an FTA, with which a factor of the abnormality is analyzed, to analyze the factor of the abnormality.

INDUSTRIAL APPLICABILITY

According to the abnormality response teaching system, the abnormality factor estimation method, the abnormality response teaching method, and the program, when an abnormality occurs in a plant or the like, the cause of the abnormality factor can be estimated with high accuracy and in a short time. According to the abnormality response teaching method of the present disclosure, when an abnormality occurs in a plant or the like, it is possible to recognize a method for handling the abnormality.

REFERENCE SIGNS LIST

1: Recovery management system
10: Abnormality response teaching system
11: Operation data acquisition unit
12: Diagnosis information acquisition unit
13: Inspection/construction information acquisition unit
14: Factor analysis unit
15: Analysis result output unit
16: Treatment work instruction unit
17: Treatment work completion reception unit
18: Reactivation preparation completion notification unit
19: Storage unit
20: Plant
30: Diagnosis system
40: Terminal device
900; Computer
901: CPU
902: Main storage device
903: Auxiliary storage device
904: I/O interface
905: Communication interface

The invention claimed is:

1. An abnormality response teaching system comprising:
a recovery valve;
an isolation valve;
an operation parameter acquisition unit that acquires an operation parameter measured during an operation of a device;
a diagnosis information acquisition unit that acquires diagnosis information indicating a result of an operation diagnosis of a machine included in the device, in which the operation diagnosis is executed by a diagnosis system before activation of the device;
a factor analysis unit that inputs, when an abnormality occurs in the device, the operation parameter and the diagnosis information to a Fault Tree Analysis (FTA), with which a factor of the abnormality is analyzed, to analyze the factor of the abnormality; and
a treatment work instruction unit that outputs treatment work instruction information in which instruction for treatment work for the factor that is analyzed by the factor analysis unit is transmitted, wherein
the treatment work instruction unit outputs
isolation valve instruction information in which instruction for an operation of the isolation valve that ensures work safety is transmitted,
work instruction information in which instruction for a work procedure for a component, which is present at a position isolated by the isolation valve, and information about the component and a position of the component are transmitted, and
recovery valve instruction information in which instruction for an operation of the recovery valve for satisfying a reactivation condition of the device is transmitted,
the abnormality response teaching system further comprising:
a treatment work completion reception unit that receives an input of completion of the treatment work; and
a reactivation preparation completion notification unit that provides a notification that a reactivation preparation is completed when all of the treatment work is completed,
in response to the output of the isolation valve instruction information, the work instruction information, and the recovery valve instruction information, operating the recovery valve and returning the isolation valve to an original state,
in response to the notification that the reactivation preparation is completed, performing the reactivation of the device.

2. The abnormality response teaching system according to claim 1, further comprising:
an inspection/construction information acquisition unit that acquires inspection/construction information indicating an actual result of an inspection or of construction executed for the device, wherein
the factor analysis unit inputs the operation parameter, the diagnosis information, and the inspection/construction information to the FTA to analyze the factor.

3. The abnormality response teaching system according to claim 1, further comprising:
an analysis result output unit that outputs an analysis result obtained by the factor analysis unit together with a fault tree of the FTA.

4. An abnormality response teaching method comprising:
acquiring an operation parameter measured during an operation of a device;
acquiring diagnosis information indicating a result of an operation diagnosis of a machine included in the device, in which the operation diagnosis is executed by a diagnosis system before activation of the device;
inputting, when an abnormality occurs in the device, the operation parameter and the diagnosis information to a Fault Tree Analysis (FTA), with which a factor of the abnormality is analyzed, to analyze the factor of the abnormality; and
outputting treatment work instruction information in which instruction for treatment work for the factor that is analyzed is transmitted, wherein
isolation valve instruction information in which instruction for operating an isolation valve that ensures work safety is transmitted,
work instruction information in which instruction for a work procedure for a component, which is present at a position isolated by the isolation valve, and information about the component and a position of the component are transmitted, and
recovery valve instruction information in which instruction for operating a recovery valve for satisfying a reactivation condition of the device is transmitted,
the abnormality response teaching method further comprising:
receiving an input of completion of the treatment work; and providing a notification that a reactivation preparation is completed when all of the treatment work is completed, in response to the output of the isolation valve instruction information, the work instruction information, and the recovery valve instruction information, operating the recovery valve and returning the isolation valve to an original state, in response to the notification that the reactivation preparation is completed, performing the reactivation of the device.

5. The abnormality response teaching method according to claim 4, further comprising:

receiving an input of completion of the treatment work; and providing a notification that a reactivation preparation of the device is completed when all of the treatment work is completed.

6. A non-transitory computer-readable recording medium that stores a program for causing a computer to execute a process comprising:

acquiring an operation parameter measured during an operation of a device;

acquiring diagnosis information indicating a result of an operation diagnosis of a machine included in the device, in which the operation diagnosis is executed by a diagnosis system before activation of the device;

inputting, when an abnormality occurs in the device, the operation parameter and the diagnosis information to a Fault Tree Analysis (FTA), with which a factor of the abnormality is analyzed, to analyze the factor of the abnormality; and outputting treatment work instruction information in which instruction for treatment work for the factor that is analyzed is transmitted, wherein isolation valve instruction information in which instruction for operating an isolation valve that ensures work safety is transmitted, work instruction information in which instruction for a work procedure for a component, which is present at a position isolated by the isolation valve, and information about the component and a position of the component are transmitted, and recovery valve instruction information in which instruction for operating a recovery valve for satisfying a reactivation condition of the device is transmitted, the abnormality response teaching method further comprising:

receiving an input of completion of the treatment work; and providing a notification that a reactivation preparation is completed when all of the treatment work is completed, in response to the output of the isolation valve instruction information, the work instruction information, and the recovery valve instruction information, operating the recovery valve and returning the isolation valve to an original state, in response to the notification that the reactivation preparation is completed, performing the reactivation of the device.

* * * * *